United States Patent [19]
Summers

[11] Patent Number: 5,852,532
[45] Date of Patent: *Dec. 22, 1998

[54] DOUBLE DIMPLE DISK DRIVE SUSPENSION

[75] Inventor: Robert N. Summers, La Habra, Calif.

[73] Assignee: Magnecomp Corp., Temecula, Calif.

[ * ] Notice: The term of this patent shall not extend beyond the expiration date of Pat. No. 5,666,241.

[21] Appl. No.: 856,452

[22] Filed: May 14, 1997

Related U.S. Application Data

[63] Continuation of Ser. No. 500,284, Jul. 10, 1995, Pat. No. 5,666,241.

[51] Int. Cl.$^6$ .............................. G11B 5/48; G11B 21/16
[52] U.S. Cl. ........................................... 360/104; 360/105
[58] Field of Search .................................. 360/103, 104, 360/105

[56] References Cited

U.S. PATENT DOCUMENTS

| | | | |
|---|---|---|---|
| 5,006,946 | 4/1991 | Matsuzaki | 360/104 |
| 5,208,712 | 5/1993 | Hatch et al. | 360/528 |
| 5,282,103 | 1/1994 | Hatch et al. | 360/104 |
| 5,446,611 | 8/1995 | Webber | 360/104 |

FOREIGN PATENT DOCUMENTS

| | | |
|---|---|---|
| 59/186173 | 10/1984 | Japan . |
| 62/065275 | 3/1987 | Japan . |

*Primary Examiner*—John H. Wolff
*Attorney, Agent, or Firm*—Louis J. Bachand

[57] ABSTRACT

A disk drive suspension assembly in which the spacing of the slider in operative proximity to the disk is determined by the additive height of separate opposed dimples on the flexure and load beam, respectively, engaged in a common locus of engagement, the flexure having in addition a local deflection to offset the outer flexure portion carrying the dimple from the inner flexure portion.

11 Claims, 2 Drawing Sheets

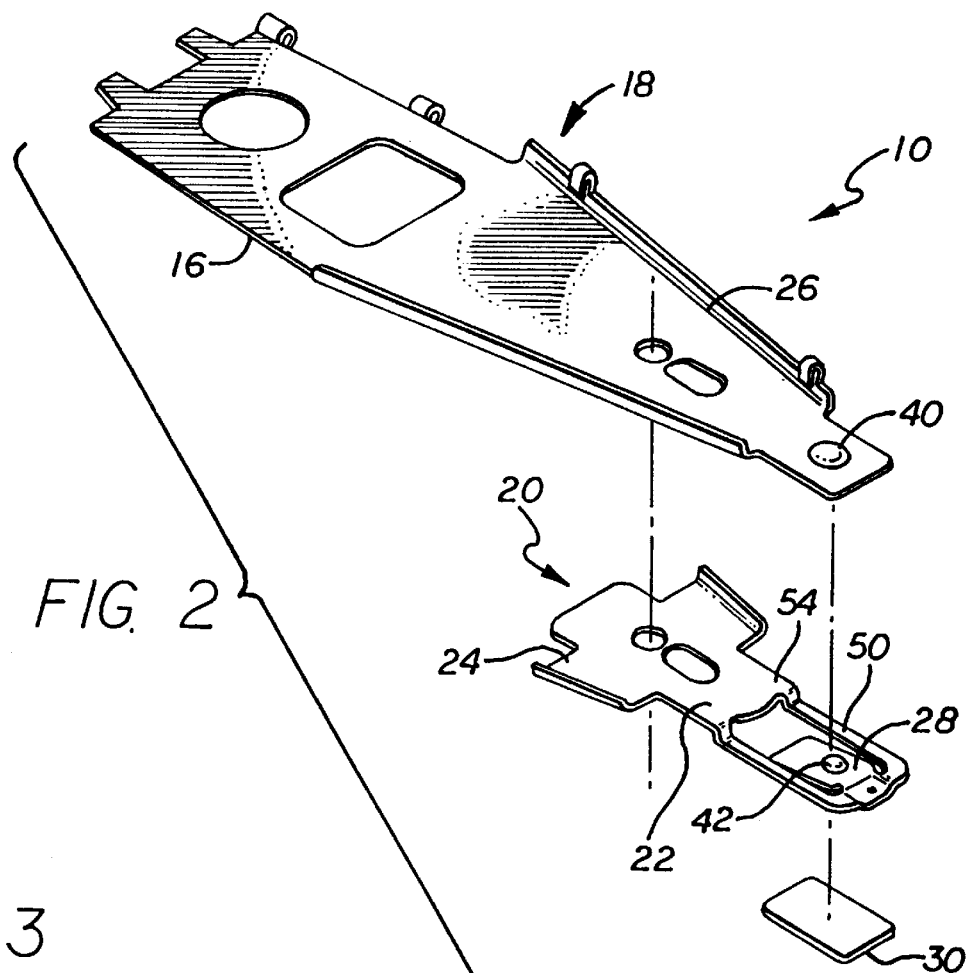
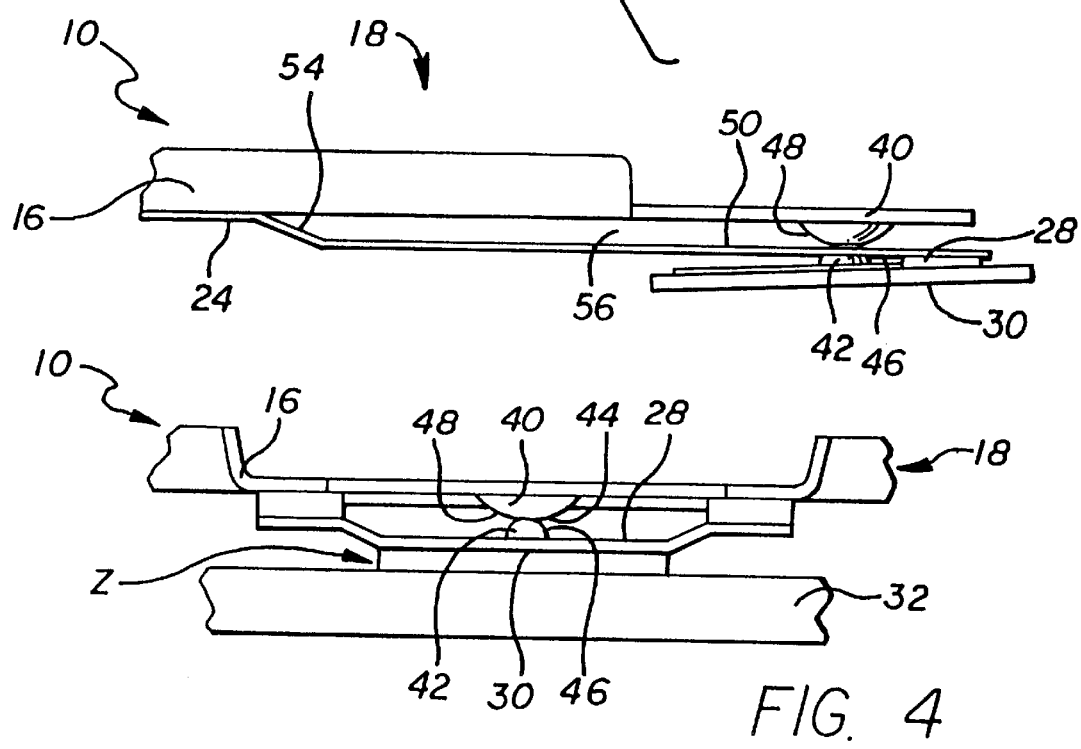

DOUBLE DIMPLE DISK DRIVE SUSPENSION

REFERENCE TO RELATED APPLICATIONS

This application is a continuation of U.S. application Ser. No. 08/500,284, now U.S. Pat. No. 5,666,241 filed Jul. 10, 1995, the disclosure of which is incorporated herein by this reference.

TECHNICAL FIELD

This application relates to computer hard disk drives and more particularly to suspensions for such drives. In an important aspect, the invention relates to maintaining the given Z value in an existing suspension design even after changes in the dimensions of the slider, in thickness for example because of technical improvements, without redesign of the suspension overall. The invention is also useful in new suspensions.

BACKGROUND OF THE INVENTION

Computer hard drives include disks and sliders, the sliders being supported on suspensions to fly closely above the disk surface in read/write relation. The spacing of the slider to the disk, the Z value, is critically maintained at design values. Improvements in the technology of sliders is desirably incorporated into on-going production of disk drives. Where such improvements result in changes in dimensions of the slider, the critical spatial relationship between the slider and disk surface may be altered unacceptably, precluding the use of the newest slider technology. Overall redesign of the suspension to accommodate the new dimensions of the slider has been the costly alternative to nonuse of the new technology.

SUMMARY OF THE INVENTION

It is accordingly an object of the invention to provide the means to adopt new slider technology in a disk drive without overall redesign of the suspension, and thus at relatively low cost. It is another object to provide simple mechanical modification of the load beam and/or flexure components, and to not otherwise revise the suspension, to make up for the change in slider dimensions and to keep the slider disk drive spacing at the original Z value of the suspension design. It is another object to provide a suspension design modified solely at the outer load beam-flexure interaction so that the suspension maintains original Z values without basic change in the inner mounting of the flexure to the load beam. Another object is to provide a disk drive suspension in which both the flexure and the load beam have dimples formed therein, opposed and sized to additively correctly position the slider for the design Z value in compensation for changes in height dimensions of the slider. Still another object is to provide a dimple to dimple engagement of the flexure and load beam for correctly positioning the slider carried by the flexure while avoiding too extreme a die modification in the metal of either the load beam or the flexure. Yet another object is to provide a contact surface between the flexure and load beam dimples which preserves the design characteristics, including pitch and roll characteristics of the original disk drive suspension. A still further object is to provide novel flexures which are locally deflected to gain spacing from the load beam and have a better angle to carry the slider to the disk and enable more accurate tracking.

These and other objects of the invention to become apparent hereinafter are realized in a disk drive suspension comprising a load beam and flexure assembly for supporting a slider in operating proximity, i.e. at a predetermined Z spacing, to a disk, the load beam and flexure separately defining first and second, opposed and mutually engageable dimples each of a size such that the slider is supported at the disk in the predetermined operating proximity not by either of the dimples individually but only by the dimples additively when the dimples are mutually engaged in a common locus of engagement.

In this and like embodiments, typically, the load beam dimple is formed integrally with the load beam, the flexure dimple has a given radius of curvature, the load beam dimple having a relatively larger radius of curvature than the flexure dimple at their locus of engagement, the load beam dimple is substantially flat, i.e. has no radius of curvature, at its locus of engagement with the flexure dimple, the flexure dimple is formed integrally with the flexure, and the flexure has an offset portion increasing the distance of the portion from the load beam, the flexure dimple being defined in the flexure offset portion.

In a further embodiment of the invention there is provided a disk drive suspension for supporting a slider at a disk, the suspension comprising an assembly of a load beam having a dimple and, opposed thereto, an adjacent flexure carrying the slider, the load beam and flexure each having inward and outward portions and a common locus of attachment at their respective inward portions, the flexure outward portion being vertically offset from the flexure inward portion to maintain the slider in operating proximity to the disk while the flexure outer portion is engaged with the load beam dimple at a locus of engagement.

In this and like embodiments, typically, there is included a local deflection of the flexure between its inner and outer portions to form the offset, the angle of the local deflection relative to the flexure inner portion is between 20 and 90 degrees, the angle of the local deflection relative to the flexure outer portion is the complement of the deflection angle relative to the flexure inner portion, the flexure defines a vertical dimple opposite to and engaged with the load beam dimple, e.g. tangentially for universal movement about the point of contact, the load beam dimple is integrally formed with the load beam and substantially flat at its locus of engagement with the flexure dimple, and as in the previous embodiment, the flexure dimple is formed integrally with the flexure, the flexure dimple has a given, relatively smaller radius of curvature, the load beam dimple having a relatively larger radius of curvature than the flexure dimple at their locus of engagement, and the load beam dimple is substantially flat at its locus of engagement with the flexure dimple, whereby the flexure dimple pivots freely thereon during pitch and roll movements of the slider.

In a further embodiment of the invention, there is provided a disk drive suspension for supporting a slider at a disk, the suspension comprising an assembly of a load beam and a vertically adjacent flexure carrying the slider, the load beam and flexure each having inward and outward portions and a common locus of attachment at their respective inward portions, the flexure outward portion being vertically offset from the flexure inward portion to maintain the slider in operating proximity to the disk.

The invention further includes, in combination, a disk drive, a disk, a slider and the disk drive suspensions described above.

The invention further contemplates the method of supporting a hard disk slider at a predetermined spacing from the disk, including carrying the slider on a flexure having a projecting dimple, carrying the flexure on a load beam having an opposed dimple, and maintaining the flexure dimple and the load beam dimple engaged in slider positioning relation at the predetermined spacing from the disk.

BRIEF DESCRIPTION OF THE DRAWINGS

The invention will be further described in conjunction with the attached drawings in which:

FIG. 2 is an exploded view thereof ;

FIG. 3 is a view taken on line 3—3 in FIG. 1; and,

FIG. 4 is a view taken on line 4—4 in FIG. 1.

DESCRIPTION OF THE PREFERRED EMBODIMENTS

Figure 1:
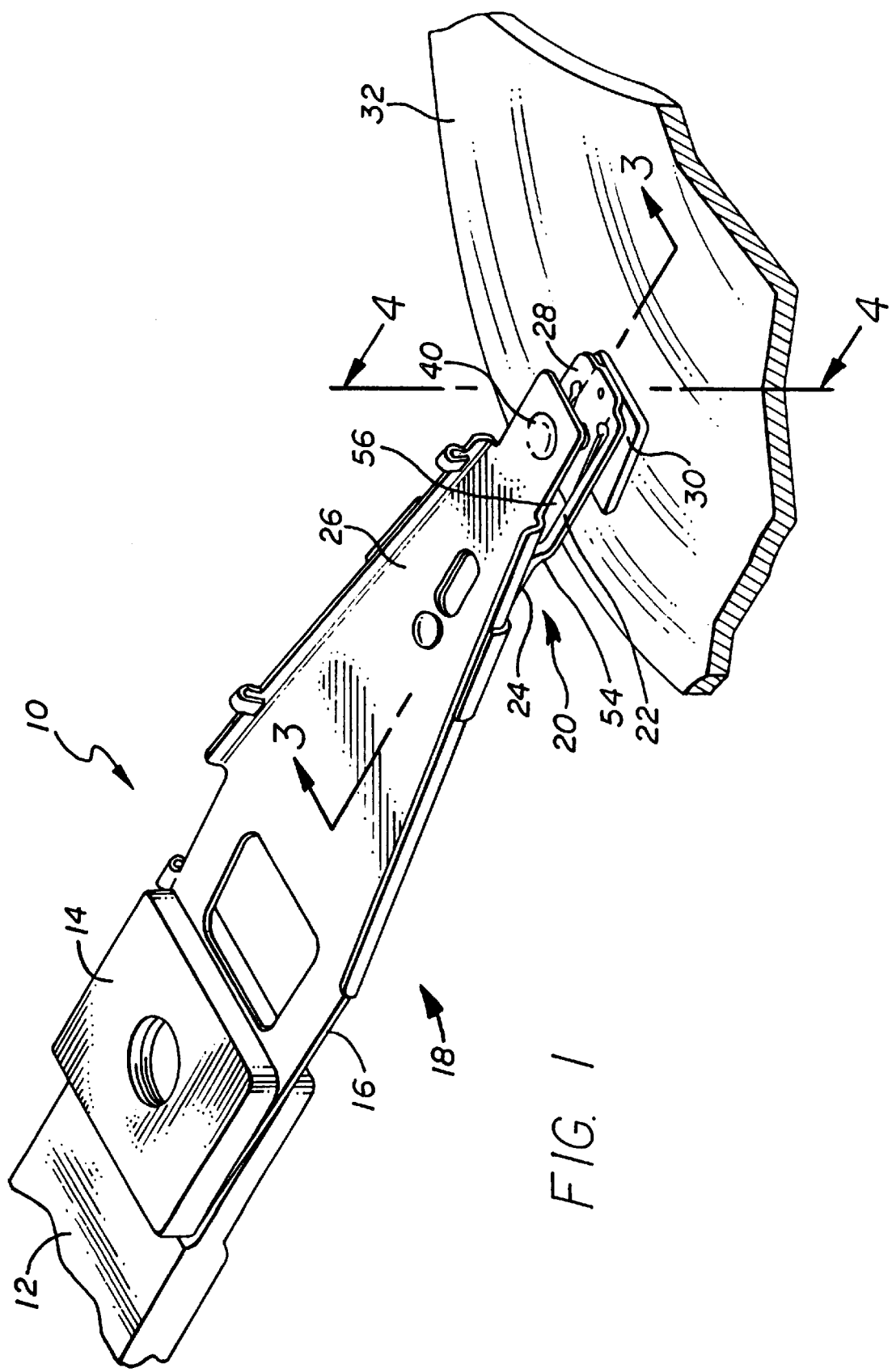
FIG. 1 is an axonometric view of the invention disk drive suspension.

The present suspension utilizes a double dimple on opposed portions of the flexure and load beam so as to achieve the predetermined close spacing of the slider to the disk, where the slider is reduced in thickness and it is nonetheless desired to be used in a disk drive intended to be used with a thicker slider. The use of a single dimple is not practical given the increased distance to be traversed to bring the slider to the correct Z value, given the limited elastic deformation capabilities of the typical stainless steels and other materials used in flexure and load beam construction. Doubling the dimples provides the needed traverse of the increased distance and can be accomplished within the parameters of an existing suspension by the expedient of forming opposed dimples which mutually engage at a common locus of engagement. Further, given the need to maintain flight characteristics, the dimples engaged surfaces are such that point contact is achieved. In addition, the flexure is stepped between its attachment to the load beam and its dimple to carry the dimple flat rather than in the small angle relation generally found between flexures and load beams. Tile parallel relation between the outer portion of the flexure and the load beam, achieved by deflecting one portion of the flexure relative to the other from a continuous angle path to a discontinuous one, has height compensation and other advantages in suspension design generally as well as in the present double dimple structure design.

With reference now to the drawings in detail, in FIGS. 1–4, the disk drive suspension 10 is shown to include an actuator arm 12 to which is mounted by member 14 to the inner portion 16 of load beam 18. Suspension 10 further includes, a flexure 20 having a base 22 carried at flexure inner portion 24 by the outer portion 26 of the load beam 18 and a flexure carriage 28 extending in cantilevered relation from the flexure base. Slider 30 is supported in desired position at a predetermined Z spacing to the disk 32 by the flexure carriage 28.

The specific design of the load beam 18 and the flexure 20 is not narrowly critical as the present invention is applicable to many styles of load beams, flexures and their combinations where there is need to modify the combination so as to compensate for height or thickness differences in the components, e.g. of the slider and there is physical room to raise up opposed dimples in the flexure and load beam components as herein described.

In the illustrated device, the slider 30 is an improved type over the slider originally intended for the suspension 10 and is somewhat thinner so that the spacing Z of the slider and disk 32 is altered unless there is a compensating change in the suspension. In the invention this compensation is obtained by having opposing dimples 40, 42 formed integrally with the load beam 18 and the flexure carriage 28 by progressive die shaping or other process of mechanical deformation of the metal to gain for the flexure 20 and load beam the respective heights which together, i.e. additively, will provide a shift in the placement of the slider 30 sufficient to compensate for the thinner profile of the slider. The modification of the suspension 10 necessary to achieve this compensation in slider placement will depend on the given suspension. Where the flexure carriage 28 already has a dimple, the second dimple can be formed on the load beam 18, and vice-versa.

The dimples 40 and 42 contact each other at a common locus of engagement 44. The contact is tangential and defined by the flexure dimple surface 46 and the load beam dimple surface 48. The contacting surfaces 46, 48 can each have a radius of curvature with the load beam dimple surface 48 preferably being nearly flat or even at a zero degree of curvature at the locus of engagement 44. The mating of the surfaces 46, 48 critically maintains the flying characteristics of the slider 30, and for this purpose the use of a curved flexure dimple 40 of lesser lateral extent than the load beam dimple 42 and the use of a higher degree of curvature on the flexure dimple surface 46 relative to the load beam dimple surface 48 provides the kind of universal rotation contact between the dimples surfaces that enables pitch, roll and other motions of the flexure 20 essential to the proper flying characteristics of the slider.

A further feature of the invention is the provision of a parallel or nearly parallel relation between the load beam outer portion 26 and the flexure base 22 outer portion 50. Typically, these outer portions 26, 50 in known suspensions have been at a slight angle as the flexure 20 and load beam 18 separate from their support connection. This angle can produce difficulties in obtaining and maintaining alignment of the flexure dimple 40 and load beam dimple 42. Accordingly, the invention modifies the normal continuous progression in spacing between flexure outer portion 50 and load beam outer portion 26 resulting from their angular disposition to a discontinuous one by offsetting the flexure outer portion from the load beam outer portion. The offset is created by deflecting the flexure inner portion 24 to form a sharp angled relation between the flexure inner portion and the flexure outer portion 50 by any suitable metal forming technique. The resulting step 54 between the flexure inner and outer portions 24, 50 brings the flexure outer portion into parallel, or substantially so, with the load beam outer portion 26, as shown. It will be noted that the flexure 20 having the described offsetting step 54 is considerably farther spaced from the load beam outer portion 26 enabling not only the improved angle of contact between flexure dimple 42 and load beam dimple 40, just described, but also the placement of additional features in the newly available space 56.

The invention thus provides the means to adopt new slider technology in a disk drive without overall redesign of the suspension, and at relatively at low cost, by a simple mechanical modification of the load beam and/or flexure components, to make up for the change in slider dimensions and to keep the slider disk drive spacing at the original Z value of the suspension design. The modified suspension design change is made solely at the outer load beam-flexure interaction so that the suspension maintains original Z values without basic change in the inner mounting of the flexure to the load beam. In the resulting disk drive suspension both the flexure and the load beam have dimples formed therein, opposed and sized to additively correctly position the slider for the design Z value in compensation for changes in dimensions of the slider, in dimple to dimple engagement while avoiding too extreme a die modification in the metal of either the load beam or the flexure and providing a contact surface between the flexure and load beam dimples which preserves the design characteristics, including pitch and roll characteristics of the original disk drive suspension. Additionally, the invention provides novel flexures which are locally deflected to gain height from the load beam and have a better angle to carry the slider to the disk and enable more accurate tracking. The foregoing objects of the invention are thus met.

I claim:

1. A disk drive suspension for positioning a slider at a disk, said suspension comprising an assembly of a load beam having inward and outward portions and a flexure having a longitudinal axis and inward portion and an outward portion and a longitudinal offset therebetween, said load beam and flexure being attached to each other at their respective inward portions, said load beam having a protuberant dimple tapering inwardly away from said load beam in a first direction and with a circular cross-section, said flexure having a protuberant dimple tapering inwardly away from said flexure in a second direction opposite to said first direction, said flexure dimple being opposed to said load beam dimple and having a circular cross-section, said flexure outward portion carrying said slider to position said slider in operating proximity to said disk while said flexure dimple is engaged with said load beam dimple at a locus of engagement.

2. The disk drive suspension according to claim 1, including a step in said flexure between its inward and offset outward portions to form said offset.

3. The disk drive suspension according to claim 2, in which the angle of said step relative to said flexure inward portion is between 20 and 90 degrees.

4. The disk drive suspension according to claim 3, in which the angle of said step relative to said flexure outer portion is the complement of the angle of said step relative to said flexure inward portion.

5. The disk drive suspension according to claim 1, in which said flexure dimple has a rounded surface oppositely curved to and engaged with said load beam dimple.

6. The disk drive suspension according to claim 1, in which said load beam dimple is integrally formed with said load beam and substantially flat at its locus of engagement with said flexure simple.

7. The disk drive suspension according to claim 6, in which said flexure dimple is formed integrally with said flexure.

8. The disk drive suspension according to claim 7, in which said flexure dimple has a surface of a given radius of curvature, and said load beam dimple has an opposing surface of a larger radius of curvature than said given radius of curvature of said flexure dimple at their locus of engagement.

9. The disk drive suspension according to claim 8, in which said load beam dimple is substantially flat at its locus of engagement with said flexure dimple.

10. Disk drive suspension for supporting a slider at a disk, said suspension comprising an assembly of load beam and a vertically adjacent flexure carrying said slider, said load beam and flexure each having inward and outward portions and an attachment at their respective inward portions, said flexure outward portion being offset from said flexure inward portion to position said slider in operating proximity with said disk, said load beam and flexure having oppositely curved, opposing dimples of circular cross-section at the locus of engagement of said load beam and flexure outward portions.

11. A method of positioning a disk drive suspension slider at a disk, including carrying said slider on a flexure having a projecting dimple with a circular cross-section, and engaging said flexure dimple with an oppositely curved, opposed load beam dimple of circular cross-section to position said slider at said disk.

* * * * *